No. 889,401.

F. P. ROSBACK.
INDEX CUTTING MACHINE.
APPLICATION FILED JULY 15, 1907.

PATENTED JUNE 2, 1908.

Witnesses:

Inventor:
Frederick P. Rosback,
By Dyrenforth, Lee, Chritton & Wiles,
Attys.

No. 889,401. PATENTED JUNE 2, 1908.
F. P. ROSBACK.
INDEX CUTTING MACHINE.
APPLICATION FILED JULY 15, 1907.

Witnesses:
Inventor:
Frederick P. Rosback,
By Dyrenforth, Lee, Chritton & Wiles,
Attys.

No. 889,401. PATENTED JUNE 2, 1908.
F. P. ROSBACK.
INDEX CUTTING MACHINE.
APPLICATION FILED JULY 15, 1907.

Witnesses:
Inventor:
Frederick P. Rosback,
By Dyrenforth, Lee, Chritton & Wiles
Attys No. 889,401. PATENTED JUNE 2, 1908.
F. P. ROSBACK.
INDEX CUTTING MACHINE.
APPLICATION FILED JULY 15, 1907.

Inventor:
Frederick P. Rosback,
By Dyrenforth, Lee, Chritton & Wiles
Attys.

No. 889,401. PATENTED JUNE 2, 1908.
F. P. ROSBACK.
INDEX CUTTING MACHINE.
APPLICATION FILED JULY 15, 1907.
11 SHEETS—SHEET 8.

Witnesses:
Inventor:
Frederick P. Rosback,
By Dyrenforth, Lee, Chritton & Wiles
Attys

No. 889,401. PATENTED JUNE 2, 1908.
F. P. ROSBACK.
INDEX CUTTING MACHINE.
APPLICATION FILED JULY 15, 1907.
11 SHEETS—SHEET 9.

Witnesses:
Inventor:
Frederick P. Rosback,

UNITED STATES PATENT OFFICE.

FREDERICK P. ROSBACK, OF BENTON HARBOR, MICHIGAN.

INDEX-CUTTING MACHINE.

No. 889,401.  Specification of Letters Patent.  Patented June 2, 1908.

Application filed July 15, 1907. Serial No. 383,745.

*To all whom it may concern:*

Be it known that I, FREDERICK P. ROS-BACK, a citizen of the United States, residing at Benton Harbor, in the county of Berrien and State of Michigan, have invented a new and useful Improvement in Index-Cutting Machines, of which the following is a specification.

My invention relates to an improvement in the class of machines for cutting the edges of sheets either before or after binding them into books, pamphlets, or other form to provide thereon tabs used for indexing.

The more important objects of my invention are to provide means for causing the step-by-step feed of the work-holding carriage with reference to the reciprocating cutter; to provide for arresting the feed of the carriage while the cutter continues to reciprocate, thereby to enable the cutting to be performed repeatedly at the same point on the work; to enable the number of sheets to be cut in each operation of the machine to be automatically indicated to the operator; to facilitate removal out of the path of the cutter of sheets that have been cut preliminary to introducing into its path other sheets to be cut; and to provide a machine in the class referred to, improved in details of construction and combinations of parts—

Referring to the accompanying drawings
Fig. 11, a broken view showing in end elevation the toothed, or stop-rack, wheel for producing the step-by-step feed, and the operating lever for the wheel, and Fig. 12, an enlarged broken sectional view showing the locking-pin device for the wheel, the section being taken at the line 12 on Fig. 11 and viewed in the direction of the arrow.
Fig. 16ª, a broken section taken at the line 16ª on Fig. 16 and viewed in the direction of the arrow.

Figure 18:
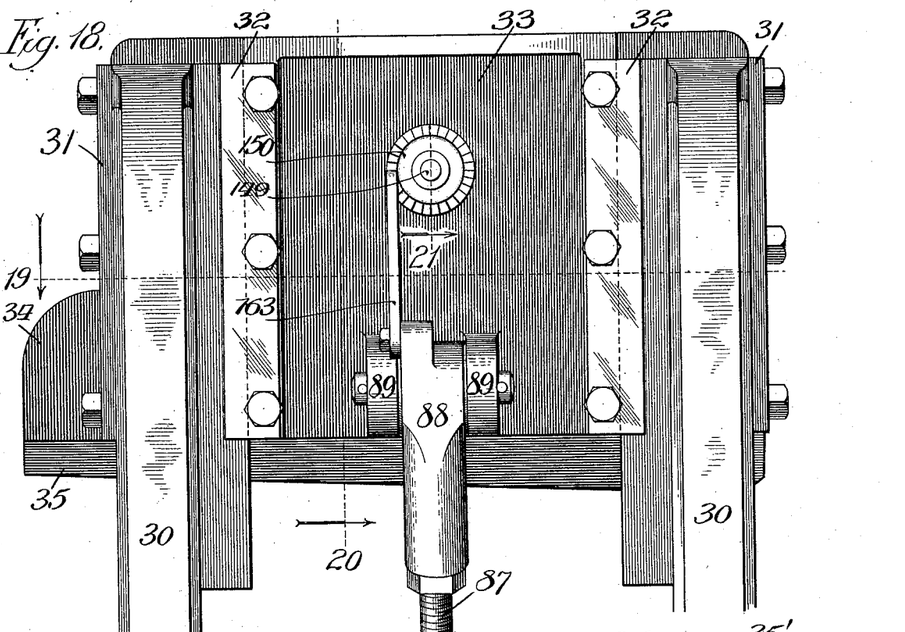
Fig. 18 is an enlarged broken view showing the head of the machine in rear elevation, with the dial-device thereon.
Figure 19:
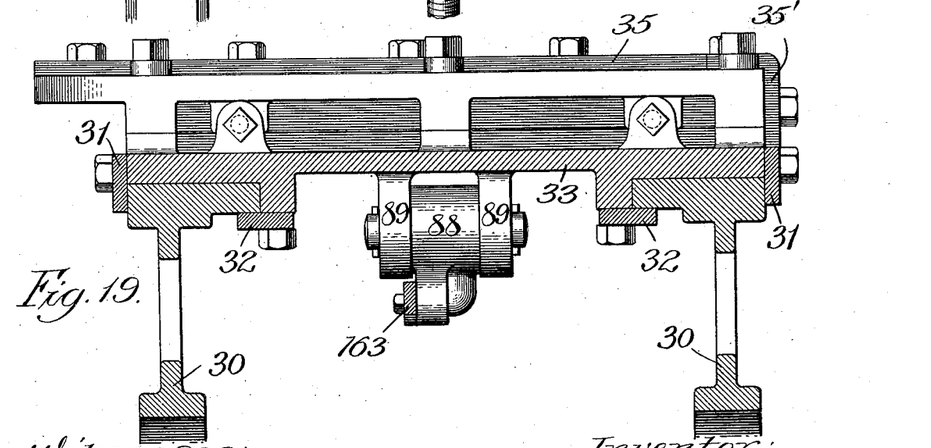
Fig. 19, a plan section taken through the head at the line 19 on Fig. 18 and viewed in the direction of the arrow.

The frame of the machine has two sides 30, 30, on the upper end of each of which is a lateral guide 31 and a rear guide 32 (Figs. 18 and 19) for a vertically reciprocating head 33 carrying adjustably on its lower end a block 34 for the upper member 35 of the cutter, which reciprocates relative to the lower stationary cutter-member 36 secured on the frame. These cutter-members are provided with end-sections $35^1$ and $36^1$, respectively, extending at right angles to their main portions for a purpose hereinafter explained. On the front side of the frame are provided arms 37 for supporting the inner rail 39 of a track 38, the outer rail 40 of which is connected with the rail 39 at intervals by tie-bars 41, and sustained by truss-bars 42 extending from the frame sides.

Figures 4, 5, 6, 7, 8, 9:
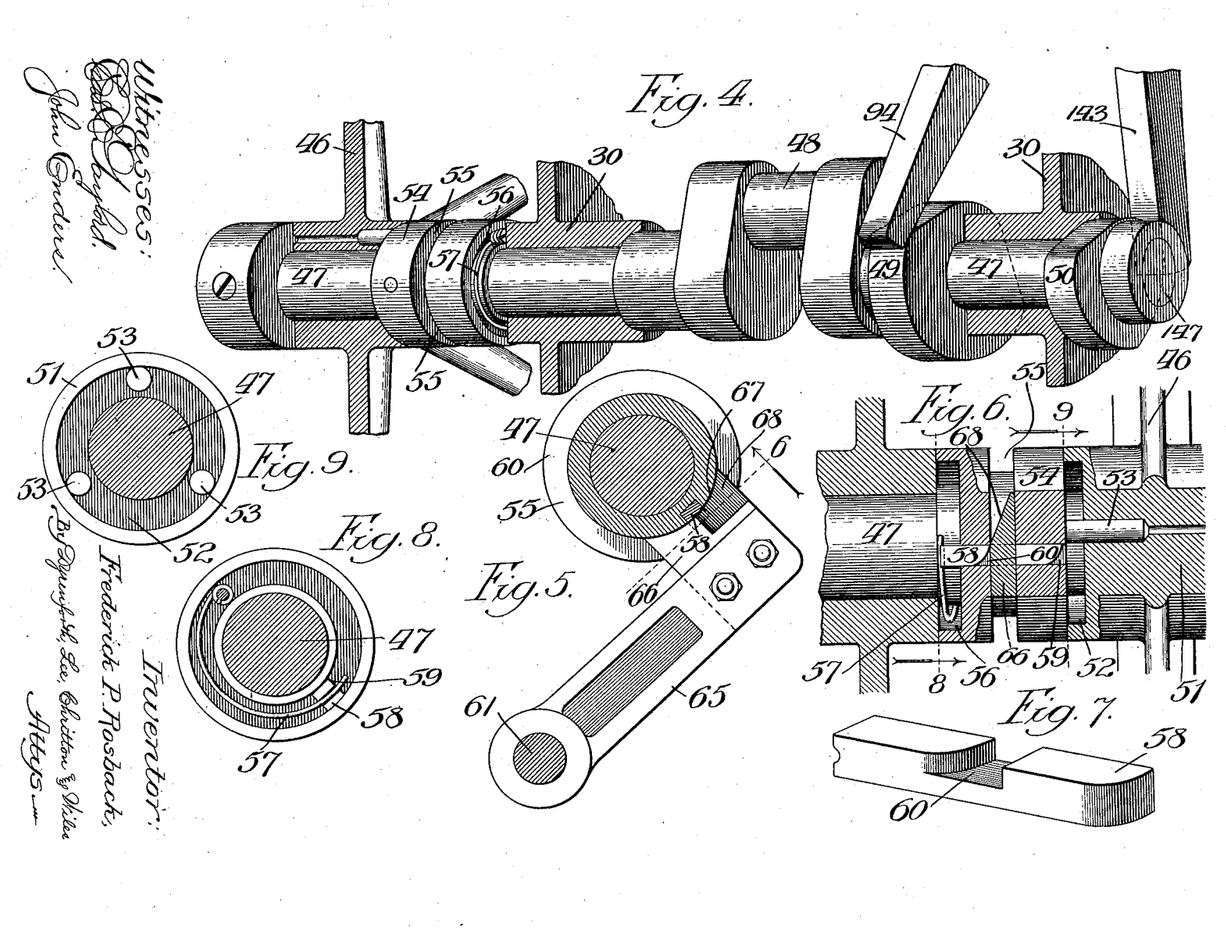
Fig. 4 is a perspective view, partly broken and sectional, showing the drive shaft of the machine with cams mounted thereon and containing a crank-section.
Fig. 5, a transverse section through the shaft and clutch showing the clutch-operating lever in elevation, the section being taken at the line 5 on Fig. 1, viewed in the direction of the arrow and enlarged.
Fig. 6, a broken section taken at the line 6 on Fig. 5 and viewed in the direction of the arrow.
Fig. 7, a perspective view of the sliding clutch-bar, shown enlarged over the representation in preceding figures.
Figs. 8 and 9 are sectional views through the drive-shaft at the clutch, illustrating details of the latter, the sections being taken, respectively, at the lines 8 and 9 on Fig. 6 and viewed in the direction of the arrows.

On a stud 43 rigidly supported to extend from a side-member of the frame 30 is journaled a belt-pulley 44 carrying a pinion 45 on its hub, meshing with a gear-wheel 46 loosely mounted on the drive-shaft 47. This shaft contains a crank-section 48 and carries cams 49 and 50, for purposes hereinafter explained; and it is journaled in suitable bearings provided in the frame-sides. The hub 51 of the gear 46 is provided in its inner face with an annular recess 52, in the base of which are secured at equal distances apart about the shaft, similar clutch-pins 53 extending at their outer ends flush with the corresponding edge of the annular wall about the recess. Adjacent to the hub 51 is pinned to the shaft a collar 54 (Figs. 4 to 8, inclusive) containing a circumferential groove 55 and provided on its inner end with an annular recess 56 about the shaft in which is confined at one end a curved spring 57 to bear at its free end against the adjacent grooved extremity of a longitudinally reciprocable clutch-bar 58. This clutch-bar works in a passage 59 formed lengthwise through the collar 54 to extend at opposite sides of the groove 55 therein, and has a rounded outer end and a central transverse recess 60, one side of which is convexly curved, as represented in Fig. 7. In the base-portion of the frame is journaled a rock-shaft 61 carrying a treadle 62, which is connected by a coiled spring 63 with a rigid part of the frame at 64. The rock-shaft carries on its outer end an arm 65, to the upper extremity of which is bolted, to extend at a right-angle to it, a finger 66 provided in its extremity with an arc-shaped recess 67 conforming to the base of the groove in the collar 54, against which the tension of the spring 63 tends to hold it; and this finger is beveled toward one edge as represented at 68. (Figs. 6 and 8).

The pulley 44 is under constant rotation in the operation of the machine, but does not drive the shaft 47, by its gear-connection therewith, because of the loose mounting thereon of the gear 46, except when the treadle 62 is depressed, because otherwise the finger 66 extends through the recess 60 in the bar 58 and holds the latter retracted against the force of the spring 57, out of the path of the projecting ends of the clutch-pins 59. By depressing the treadle, however, the rock-shaft 61 is turned in opposition to the spring 63 to withdraw, by the consequent turning of the arm 65, the finger 66 from the recess 60 and free the spring 57 to permit it to shoot the clutch-bar into the path of the pins 53, one of which, in the rotation of the gear, will encounter the projecting end of the bar and thus rotate the drive-shaft until the treadle is released to permit the recoil of the spring 63 to return the finger 66 into the recess 60 in the bar 58 when the bar-recess comes into coincidence with the retracting finger in the continued rotation of the shaft, whereupon the finger enters the recess in the clutch-bar and retracts the latter from the path of the pins 53.

Figure 13:
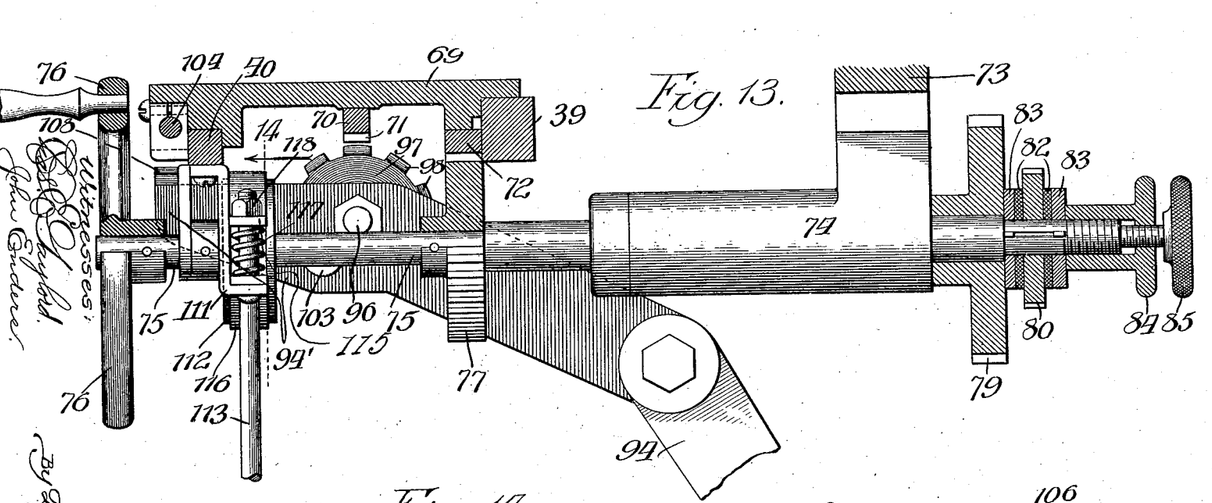
Fig. 13 shows the carriage-feeding mechanism by a broken view in sectional elevation, the section being taken at the irregular line 13—13 on Fig. 1 and regarded as indicated by the arrow.

On a horizontal track 38 (Fig. 13) is reciprocably mounted a carriage 69 carrying centrally on its lower face a longitudinal rack 70 having downwardly projecting teeth 71 at uniform distances apart; and extending parallel with the rack 70, along the bottom of the carriage near its inner side, is a rack-bar 72. Depending rigidly from a cross-bar 73, which extends between the frame-sides of the machine and carries the lower stationary cutter-member 36, is an elongated sleeve 74 extending crosswise of the cutter, in which is journaled the feed-shaft 75, shown to be provided on its forward end with a crank-wheel 76 and carrying a pinion 77 in mesh with the rack 72. In a circular housing 78 (Fig. 16) rigidly supported on the bracket which carries the sleeve 74, is loosely mounted on the feed-shaft a pinion 79 and similarly mounted a ratchet 80, engaged by a spring-pressed dog 81 pivoted on the rear face of the pinion, the ratchet being confined between a pair of friction-washers 82 (preferably of leather) about the shaft, embraced between metal washers 83, these washers and the ratchet between them being clamped together against the face of the pinion 79 by a nut 84 screwed upon the rear end of the shaft and held by a jam-nut 85. The metal washers 83 are keyed to the feed-shaft, as indicated in Fig. 13, to rotate with it. Thus by driving the pinion 79, its frictional engagement with the shaft will rotate the latter unless the strain be excessive, when the leather washers will slip against the metal washers. With the pinion 79 engages a vertical rack 86 rigidly depending from the rear face of the head 33 to one side of the vertical center thereof, this head being reciprocated by its connection with the crank 48 on the shaft 47 through the medium of a connecting-rod 87 provided on its upper end with a head 88, at which it is pivotally connected with lugs 89 on the back of the reciprocating head 33 of this machine. A rigid finger 90 (Fig. 17) extends from a frame-side and is provided with a beveled forward end, affording a cam 91, in the path of the free end of the dog 81 to disengage the latter from the ratchet 80, as and for the purpose hereinafter explained.

As will be understood from the foregoing description of the mechanism, by rotation of the shaft 47 its crank 48 reciprocates the head 33 carrying the knife 35. In each down-stroke of the head, (see Fig. 17) the shaft 75 is not turned because the engagement of the rack 86 with the pinion 79 rotates the latter about the shaft in the direction to slide the spring-dog 81 over the teeth of the ratchet 80, while in the up-stroke of the head 33 the rack 86 rotates the pinion 79 in the opposite direction to engage the dog with the teeth of the ratchet, thereby rotating the feed-shaft through the frictional binding thereto of the ratchet. When the dog encounters the cam-end of the finger 90 it is deflected out of engagement with the ratchet-wheel to discontinue rotation of the latter. This rotation of the shaft 75 by the action of the pinion 77 on the rack 72 actuates the carriage 38 in the direction of feeding. The feeding of the carriage is required to be by step-by-step movement, and this is accomplished by either one of two means for the purpose, the one being used where the step-movements of the carriage are required to be uniform, and the other, where the steps are required to vary in length.

Figure 10:
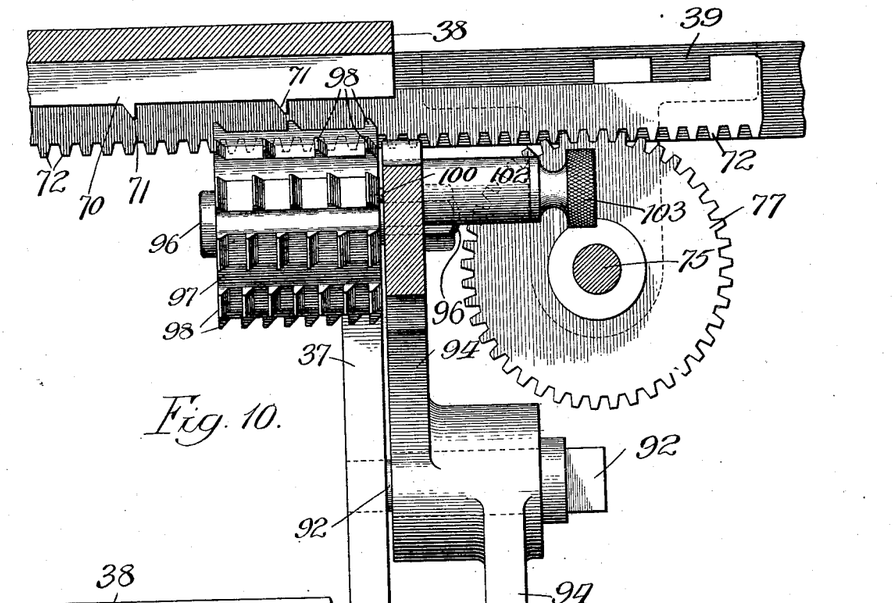
Fig. 10 is an enlarged broken sectional view showing in elevation one of the two devices employed for producing the step-by-step feed of the work-holding carriage.
Figures 11, 12:
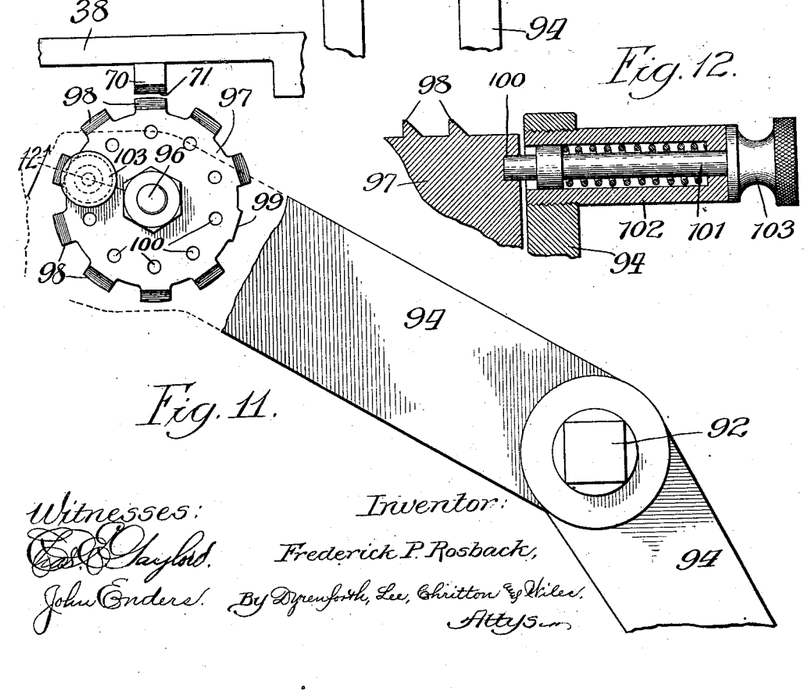

Following is a description of the first-named means: On a stud 92 (Figs. 10 and 11) extending horizontally from an arm 37 is fulcrumed an offset-lever 94, one arm of which extends into the path of the cam 49 on the drive-shaft, contact therewith being maintained by a coiled spring 95 connecting the lever with the frame, and the opposite end carrying a horizontal pin 96 on which is rotatably mounted a stop-rack wheel 97. This wheel is provided circumferentially with longitudinal rows of stop-teeth 98, the number of teeth and their distance apart varying in the different rows, though they are uniformly spaced apart in each row, except that a single stop-tooth is provided for one position of the wheel and that this single tooth does not, of course, constitute a row. Adjacent to the single tooth is a row consisting of two stop-teeth, the next adjacent row consists of three such teeth; and so on up to and including nine teeth in a row, between which and the single tooth is a space 99 unprovided with stops. Obviously, the number of rows of teeth on the wheel may be greater or smaller than that shown and described, according to the work to be performed. In the relative arrangement of the teeth of the rack 70 and those on the wheel 97 it is important that the distance between teeth 71 shall be a multiple of the distance between teeth 98 in each row thereof. By providing the stop-rack wheel as a rotary member, it is adapted to be adjusted by turning to bring, at will, the space 99, the single tooth 98, or any of the rows of stop-teeth into the path of the rack 70. To secure the wheel 97 in adjusted position (see Figs. 11–12), it is provided in one end with a circular series of sockets 100, each adapted to receive a spring-pressed retaining pin 101 supported in a tubular housing 102 screwed into the upper portion of the lever 94 and provided with a handle 103 by which to manipulate it. Thus by turning the wheel 97 to bring the space 99, the single tooth 98, or any row of teeth thereon into the path of the rack 70, a socket 100 will register with the pin 101 to receive it and retain the stop-rack wheel in its adjusted position.

Figure 1:
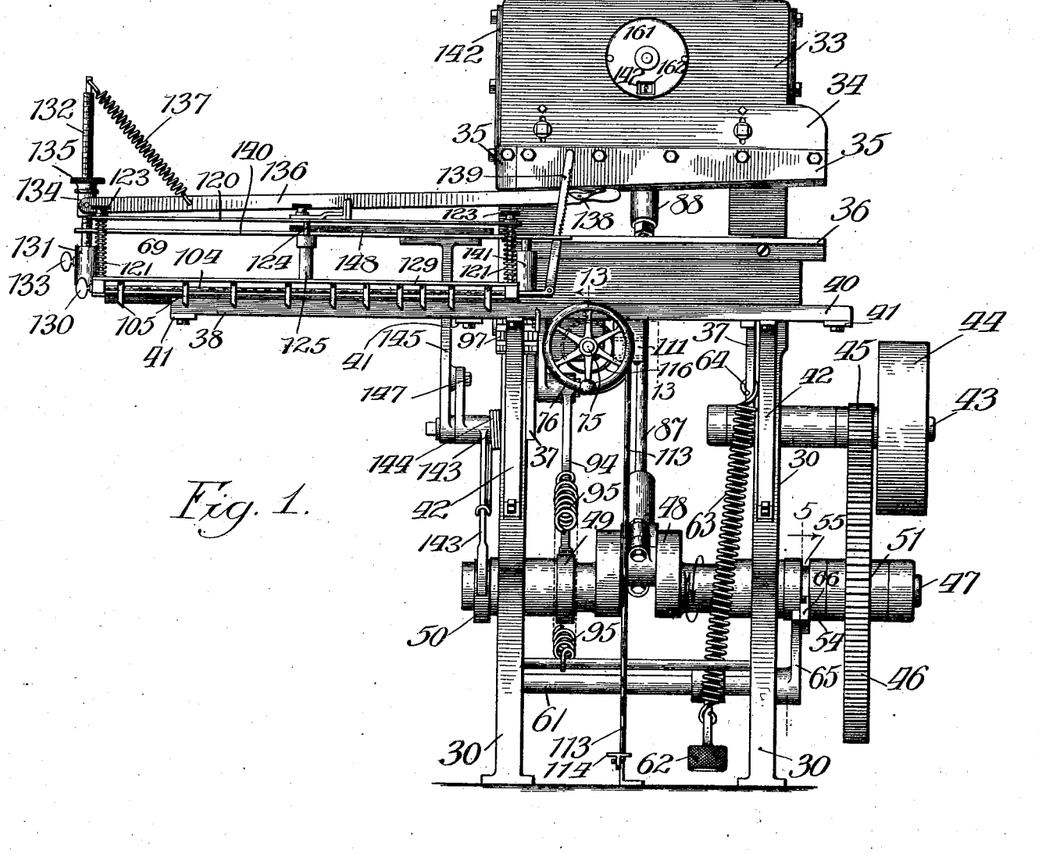
— Figure 1 is a view in front elevation of my improved machine, showing the operating parts in the positions they assume between operations, that is, when at rest.

The operation of the parts is so timed that during the first half of the rotation of the shaft 47, in the direction indicated by the arrow upon it in Fig. 1, to lower the upper cutter-member 35 the engagement of the cam 45 with the lever 94 is such as to turn it to hold the wheel 97 in its normal lowered position, wherein the respective stop-teeth 98 are withdrawn from the path of the rack 70. During this time the feed-shaft 75 is not rotated because the rack 86 is turning the pinion 79 in the direction to slide the pawl 81 over the teeth of the ratchet 80. Immediately after the head 33 carrying the cutter-member 35 begins to rise under the continued rotation of the shaft 47, the cam 49 presents to the lever 94 that portion of its face which permits the spring 95 to act in turning the lever, to raise the wheel 97 with its respective tooth or row of teeth into the path of the rack 70, whereby when in the up-stroke of the rack 86 it causes engagement of the pawl 81 with the ratchet 80 to turn the feed-shaft 75, the carriage 38 will be moved by the action of the pinion 77 upon the rack 72 until a stop-tooth 98 is encountered by a rack-tooth 71. Thereafter, the continued rotation of the ratchet 80 until the pawl 81 encounters the cam-end of the finger 90 to disengage it from the ratchet, will fail to exert any further rotating action on the shaft 75, since the strain of overcoming the obstruction of the respective stop-tooth 98 will overcome the friction between the washers 82 and 83, thereby permitting the upper cutter-member 35 to complete its up-stroke during the stoppage of the carriage. As soon as the action of the finger 90 disengages the pawl 81 from the ratchet 80, there being then no need for continuing the maintenance of the wheel 97 in its raised position, the cam 49 attains such engagement with the lever 94 as to lower the wheel to its normal position, where it stays until the crank 48 again begins to raise the head.

Figure 15:
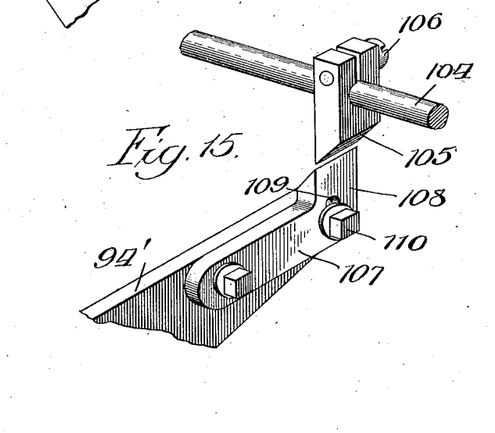
Fig. 15 is a broken perspective view showing another device for producing the step-by-step movement of the carriage when the steps vary in length, to effect feeding of the carriage accordingly to cause tabs of different lengths to be cut on the work.

The other feed, referred to, for effecting variation in the step-by-step feed of the carriage, involves the following-described construction: On the forward side of the carriage and extending longitudinally thereof (see Figs. 1, 13 and 15) is rigidly supported a rod 104 having stop-teeth 105 depending from it. Each tooth, which has a beveled lower edge, is slotted through its upper part to the opening through which the rod 104 passes to adapt it to be clamped upon the rod by a set-screw 106, loosening of which permits the tooth to be moved by sliding it upon the rod to any desired position, wherein it may be secured by tightening the screw. On an extension $94^1$ (Fig. 15) of the lever 94 is pivoted a finger 107 which terminates in an upwardly turned stop-tooth 108 containing an elongated slot 109, through which it is adjustably fastened to the side of the extension $94^1$ by a set-screw 110 to afford to the tooth 108 slight vertical adjustment. The teeth 105 are set apart on their supporting rod at varying intervals to correspond with variations in the length of the tabs to be cut on the work. When this stop-device is used on the machine, the wheel 97 is set and secured by the pin 101 in position to register its space 99 with the rack 72, thereby placing the stop-wheel out of use. Then, after the head 33 begins to rise, the action of the spring 95 on the lever 94 will raise the tooth 108 into the path of a tooth 105 each time the cutter-member 35 descends, to stop the feed during the cutting operation in the same way as described of the device 97. Obviously, the carriage may move to the extent of the distance between successive teeth 105, being stopped in each instance by the raised tooth 108 irrespective of the relative distances apart of the teeth 105. The purpose of the slight adjustment of the stop tooth 108 (see Fig. 15) is to permit it to be lowered out of the path of the teeth 105 when this stop-device is out of use and the wheel 97 is in use.

Figure 14:
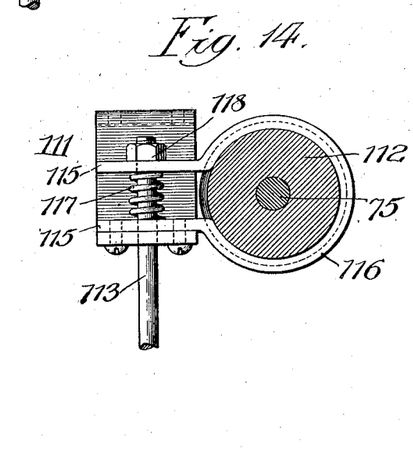
Fig. 14 is a section taken at the line 14 on Fig. 13 and viewed in the direction of the arrow, showing the friction-clutch on the shaft of the carriage-feeding mechanism for temporarily arresting the feed while the reciprocating cutter is operating.

Sometimes it is desirable to cause the reciprocating cutting-member to act repeatedly at the same point on the work. This occurs when the number of sheets to be cut renders the work too thick to be properly severed by the knife, so that that number has to be divided into sections to be cut successively. This could not be done if the carriage had to be fed in each upstroke of the head 33, so that to adapt the machine to perform this function the feed of the carriage must be arrested during such repeated cuts of the knife. To accomplish this purpose the following-described mechanism is provided:

Depending from the rail 40 of the track is a bracket 111 (see Figs. 1, 13 and 14) adjacent to the shaft 75, where the latter has secured rigidly upon it a peripherally grooved collar 112. A rod 113, attached at its lower end to a treadle 114, passes at its upper end through the bracket and through the arms 115 of an annular spring brake-band 116 about the collar 112 in the groove thereof; the rod being surrounded by a spring 117 confined between the brake-arm 115 by a nut 118 screwed upon the upper end of the rod. In the normal condition of the brake-device, the band 116 loosely surrounds the collar 112 to avoid interference with the rotation of the shaft 75 in the manner already described for producing the feed of the carriage, the action of the spring 117 being to spread the arms 115 and thus expand the brake-band. By depressing the treadle 114, however, the rod 113 is pulled downward against the resistance of the spring 117 to lower the upper brake-arm 115 and thereby hug the band 116 about the collar to brake the shaft. The braking action thus produced, which continues so long as the treadle 114 remains depressed, is sufficient to overcome the friction between the washers 82, 83 and thus avoid interference with the action of the rack 86 notwithstanding stoppage of the feed.

Figure 2:
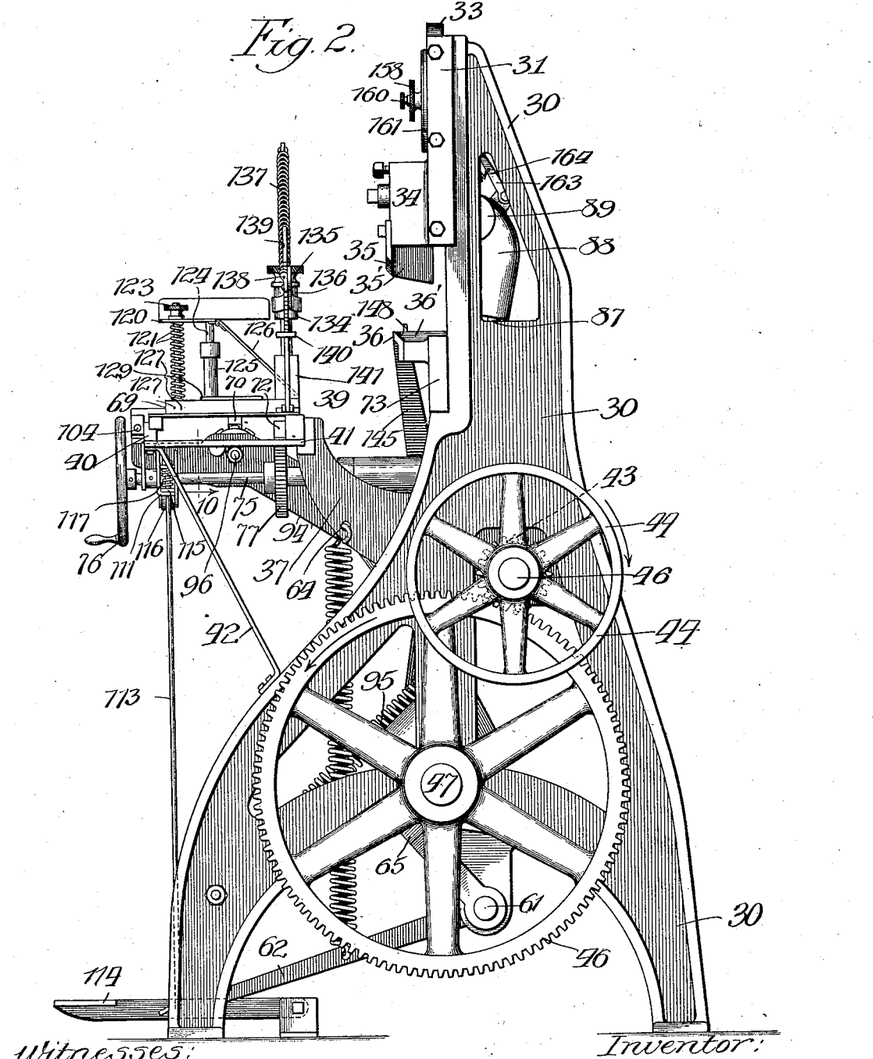
Fig. 2 is a side elevation of the machine viewed from the right hand side of Fig. 1.
Figure 3:
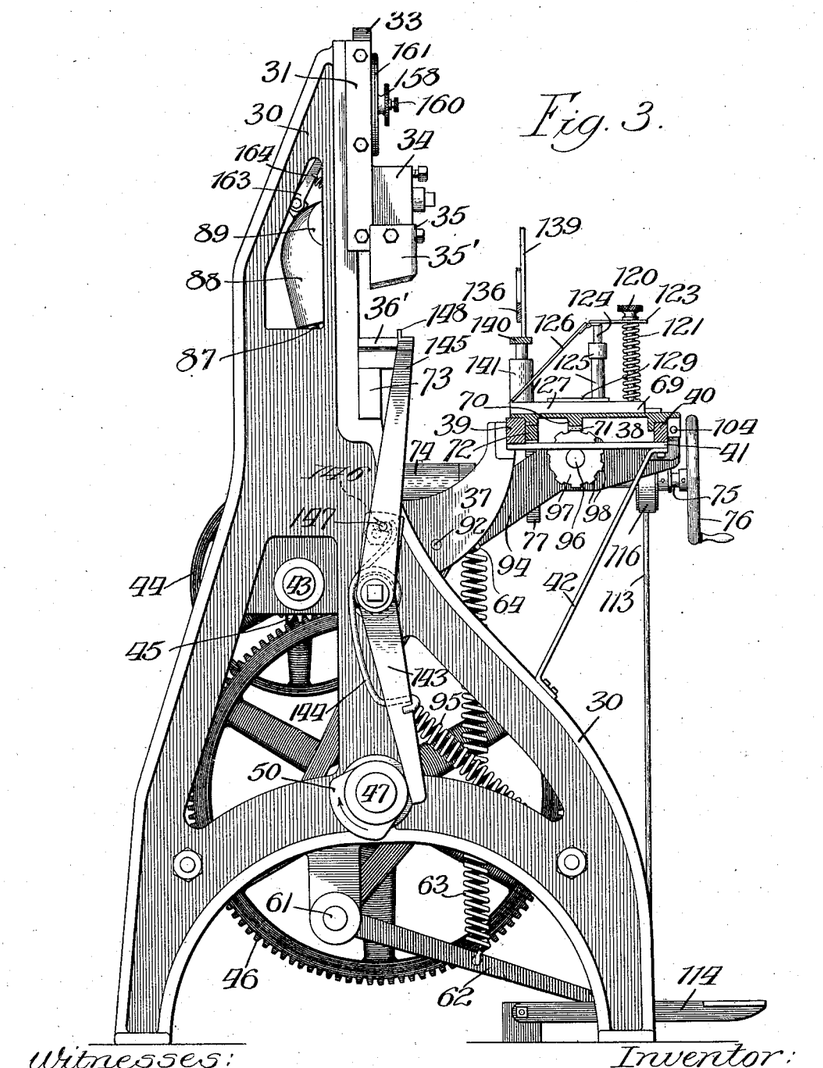
Fig. 3, a similar view of the opposite side of the machine, showing the carriage in transverse section.

For supporting the work, represented in the present instance as a book 119, suitable means are provided on the carriage, the means illustrated comprising the following-described construction: A table 120 (see Figs. 1, 2 and 16) is supported on springs 121 surrounding posts 122 which rise from the carriage near its opposite ends, the table being adjustably confined on the springs by thumb-nuts 123 working upon the upper ends of the posts, whereby raising the thumb-nuts enables the springs to raise the table and lowering them lowers it against the resistance of the springs. The table is supported toward its inner edge, for guidance in its adjustments, by a depending stud 124, centrally between the table-ends, telescoping with a tubular post 125 on the carriage. On the inner edge of the table is hinged a leaf 126 to adapt it to assume the inclined position represented in Fig. 16. This leaf is omitted from Fig. 1, since if it were there shown it would hide other details which require to be presented to view in that figure. The posts 121 rise from angle-bars 127 (Fig. $16^a$) extending transversely across the carriage at its ends and slidingly engaging with similar but oppositely facing angle-bars 128 rigidly mounted on the carriage-ends, the bars 127 being connected by a plate 129 from which the hollow post 125 rises. This construction enables the table to be moved back and forth transversely of the carriage to adapt it to support wider and narrower books 119, by sliding the bars 127 in the proper direction, set-screws 130 being provided for holding them in adjusted position. On the left-hand end of the carriage near its inner side (Fig. 1) is mounted in a socket 131 a vertical threaded post 132, fastened by a thumb-screw 133 and carrying a sleeve 134 above which a nut 135 screws on the post to limit the rise of the sleeve. A lever 136 is fulcrumed on this sleeve and resiliently sustained by a coiled spring 137 connecting it with the upper end of the post, the handle-end of the lever carrying a spring-pressed pawl 138 to engage with a ratchet-bar 139 rising from the forward end of the carriage, where it is pivoted though it is rendered rigid with reference to the engaging pawl 138 by passing upwardly through an opening (not shown), in which it fits, provided in a bar 140 extending lengthwise of the carriage near its inner side and supported at its ends on posts 141. The bar 140 is on the same level as the lower stationary member 36 of the cutter and affords a rest for the leaves to be cut, which cross it.

Figures 16, 16A, 17:
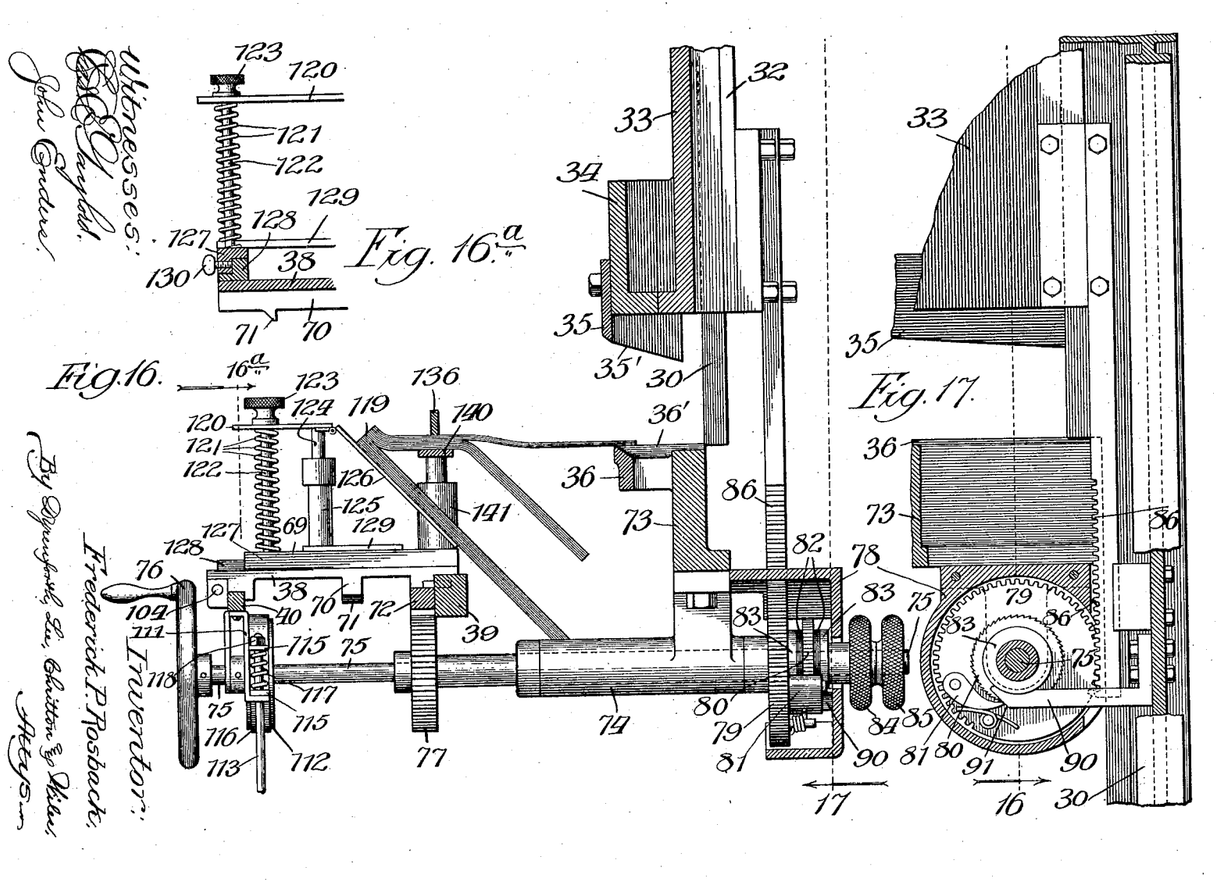
Fig. 16 is a broken view in vertical sectional elevation through the head of the machine, transversely of the shaft of the feed-mechanism, the section being taken at the line 16 on Fig. 17 and viewed in the direction of the arrow.
Fig. 17, a section taken at the line 17 on Fig. 16 and viewed in the direction of the arrow.

To cut the index-tabs in the edges of a book, it may, if it be comparatively narrow, rest on the inclined table-leaf 126, as shown in Fig. 16, with the leaves to be cut crossing the bar 140, on which they are clamped by lowering the lever 136 against them to be held by engagement of the dog 138 with the ratchet-bar 139; and when the work is done, to release the book preparatory to its removal, disengagement of the pawl causes the spring 137 to raise the lever for the purpose. If the book be larger, it will rest on the table 120, the described adjustment of which adapts it to support books or sheets of greater or lesser width.

Figure 26:
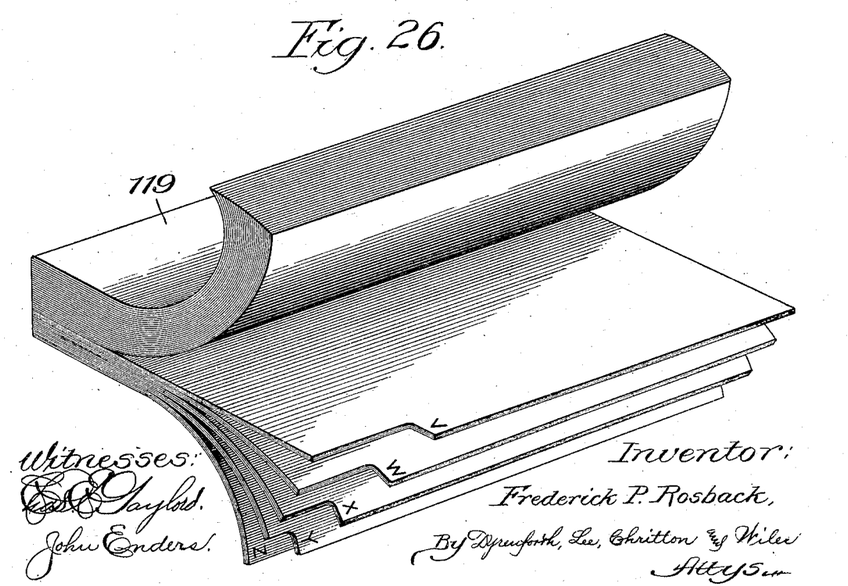
Fig. 26 is a perspective view of a book having a portion of its leaves indexed by my improved machine.
Figure 27:
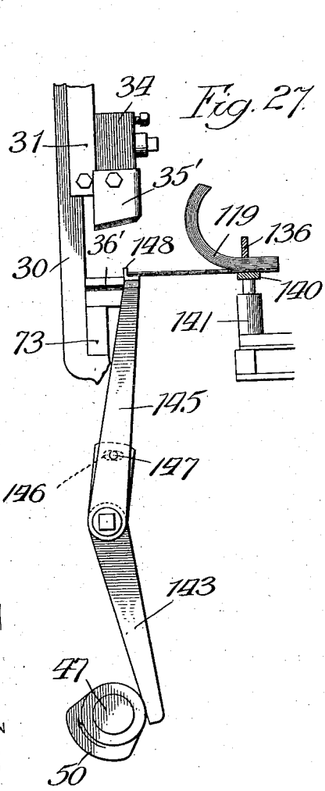
Figs. 27, 28 and 29 are views in the nature of diagrams illustrating different stages of the operation of the machine on the work.
Figure 28:
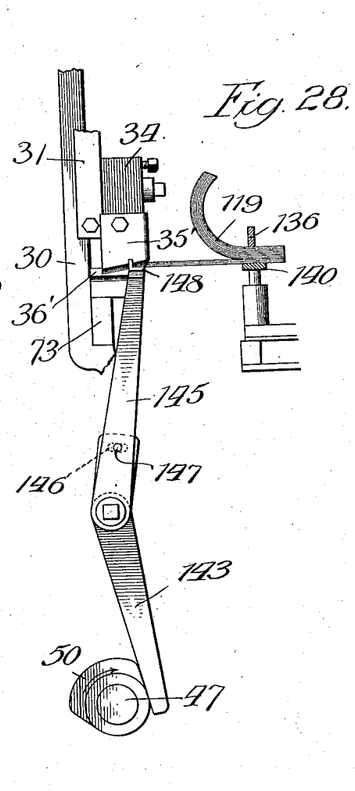
Figure 29:
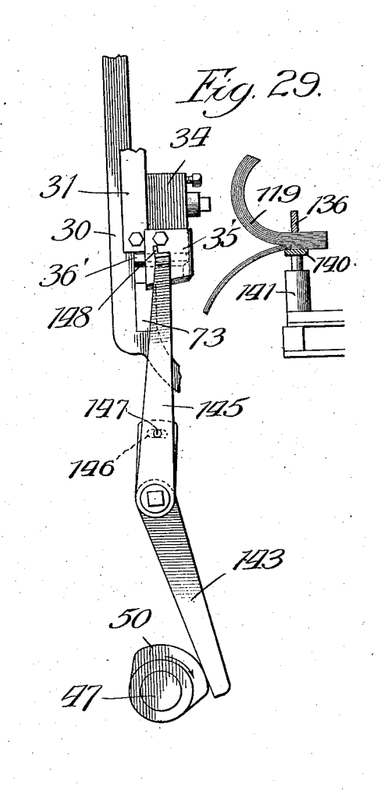

Unless a dial 142 be provided, as and for the purpose hereinafter described, the operator may prepare the sheets or book to be indexed by inserting between sections, each composed of a number of leaves to be cut for the same index-character, strips of paper with their ends projecting beyond the free edges of the sheets, which, with a book adjusted in position on the machine to be operated upon, may be laid on the stationary knife-member 36. The book being clamped in place, as described, the operator curls the leaves backward into the condition represented in Fig. 26, holding them by hand, and permits, for the first operation of the machine, the number of sheets to be cut for the index-character, as Y, preceding the final index-character as Z, to drop with the free edge resting on the lower cutter-member by freeing from his grasp that number of sheets, in which he is guided by the inserted strip separating that number from the rest of the sheets. When the first bunch of sheets has been thus cut, the next bunch is released by the hand of the operator to be cut, and so on through the book. As shown in Fig. 16, all the sheets to be cut of the book 119 have been operated upon by the cutting mechanism except the last section of sheets, the free edge of which rests upon the stationary cutting-member in position to be cut by the descent of the reciprocating member, the sheets previously cut having dropped to the position shown to take them out of the way. This dropping function is performed by mechanism described as follows:

Fulcrumed between its ends on an outer side of the frame is an offset-lever 143 (see Figs. 1, 3, 27, 28 and 29) with its lower arm in engagement with the cam 50 on the shaft 47, wherein it is maintained by a spring 144. On the same fulcrum is an arm 145 connected with the upper, shorter arm of the lever 143 through an elongated slot 146 therein by a set-screw 147 passing through the slot into a bearing on the adjacent side of the arm 145. On the upper, headed end of this arm is secured an angular shelf 148, which normally alines with the lower cutter-member 36 and serves to support the free edges of the bunch of sheets preparatory to cutting the same, the shelf supporting the sheet-edges throughout a portion of their length while the lower cutter-member supports only the length thereof to be cut. After each cutting operation resulting from the descent of the knife 35, the action of the cam 50 turns the lever 143 to withdraw the shelf 148 from the position in which it is shown in Figs. 27 and 28 to that represented in Fig. 29, thus withdrawing the support from the sheet-edges and permitting them to drop to the position represented in the last-named figure. When the knife 35 is performing its cutting operation, the cam 50 occupies the position shown in Fig. 28, wherein it is about to engage the lever 143, and it engages the latter to withdraw the shelf while the knife is rising and the feed is taking place, the parts being so timed that the cam 50 permits the return of the shelf 148, under the action of the spring 144 on the lever 143, with each arresting of the carriage, at which time the operator drops another number, (releasing them from his hand one at a time) of the sheets, to be cut to rest at its free edge on the stationary cutter-member and the shelf. Moreover, the shelf 148 also serves as a gage for the width of cut for the index-tabs. This is due to the adjustment afforded to the arm 145, which may be set further back from or nearer to the cutting edge of the lower cutting-member to permit a greater or less width of the edge-portion of the sheet or sheets to extend over the cutting edge.

Figures 24, 25:
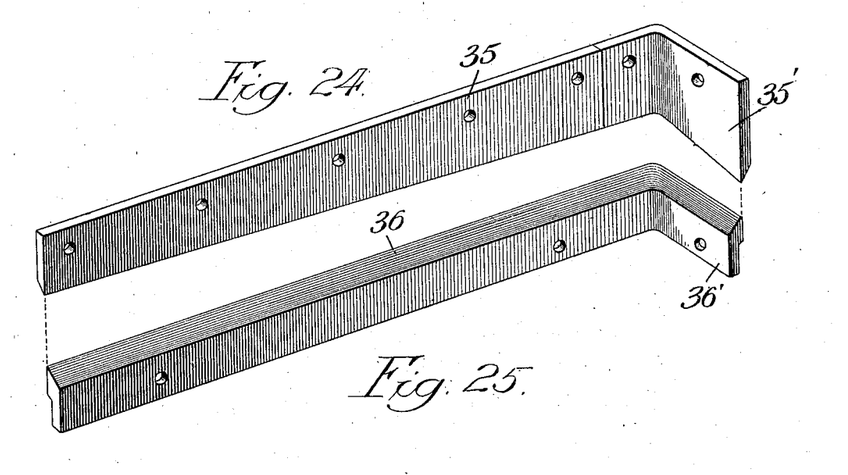
Figs. 24 and 25 are perspective views of the upper and lower cutter-members, respectively.

The cut produced by the knife-mechanism being necessarily of rectangular shape, the cutter-members are formed of corresponding shape, as represented; and to prevent forming too sharp an angle in the paper at which it would be liable to tear, the junction between the sections of each cutter-member is slightly curved, as represented most clearly in Figs. 24 and 25, to produce a rounded corner in the cut of the sheets.

Figures 20, 21, 22, 23:
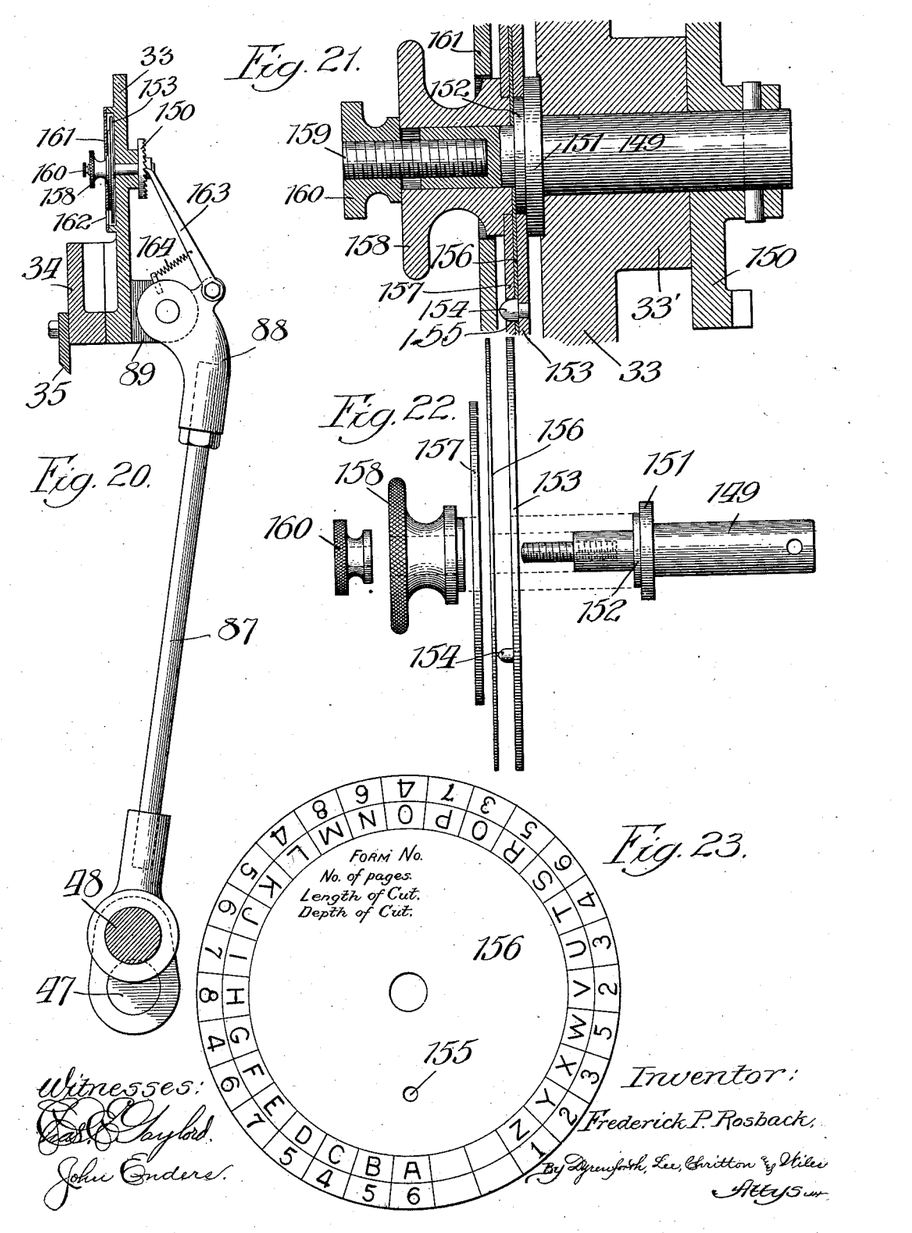
Fig. 20, a section taken at the line 20 on Fig. 18 and viewed in the direction of the arrow, showing the crank-portion of the main driving shaft and rod connecting it with the reciprocating cutter-head, and also the dial-actuating means connected with the rod.
Fig. 21 is an enlarged broken view showing the dial-device in sectional elevation, the section being taken at the line 21 on Fig. 18 and viewed in the direction of the arrow.
Fig. 22 shows, in elevation, parts of the dial-device in unassembled relation.
Fig. 23 is a face view of the dial.

For indicating to the operator the number of sheets to be released for successive cuts and particularly to avoid the necessity of preparatorily separating the bunches through the medium of the slips, as described, the machine may be equipped with an automatic dial-indicator, a desirable construction of which is shown in the drawings; particular reference being had to Figs. 21 to 23 inclusive.

At a boss 33¹ on the back of the head 33 a bearing is formed through the latter for journaling a spindle 149 having pinned on its rear projecting end, to bear against the boss, a ratchet 150 and provided on its forward portion with a collar 151 let into the face of the head for coöperating with the ratchet to confine the spindle against longitudinal movement. Upon an annular shoulder 152 on the face of the collar is mounted a metal washer 153 carrying a forwardly projecting stud 154 to enter a hole 155 in a dial 156 confined against the face of the washer and which may be a paper disk. Another metal washer 157, containing a hole to register with the hole 155 and receive the stud 154, is confined against the face of the dial by a thimble 158 on the forward projecting end of the spindle 149, from which extends a screw-stem 159 to receive a nut 160 for fastening the thimble to clamp the parts 153, 156 and 157 frictionally together. The dial 156 is provided about its center with a circumferential series of characters, which may be the letters of the alphabet, or other characters, to correspond with those of the index. With a dial thus provided, the operator, after he has ascertained the number of sheets for each index-character, marks the dial accordingly, in a series about the characters thereon, with the number of leaves to be cut for each as represented in Fig. 23. A separate dial may thus be provided for each job. After the parts of the dial-mechanism, namely the washers with the dial 156 between them, have been assembled on the spindle 149, a cover 161 is fastened to the face of the head 33 in position to cover the dial, when the thimble 158 and the nut 160 are applied. An opening 162 is provided in the dial-cover through which to expose, one at a time, the characters on the dial with the number belonging to each. On the head 88 of the connecting-rod 87 extending from the crank 48, is pivoted a pawl 163 held yieldingly in engagement with the ratchet 150 by a spring 154. By this construction each complete rotation of the shaft 47 causes the head 88 to turn on its pivot to retract the dog 163 and slide it over a tooth of the ratchet 150 and to engage it with that tooth to turn the ratchet and rotate the dial to cause it to register the characters thereon with their respective numbers successively at the casing-opening by the successive operation of the machine. Thus the operator is informed by a glance at the dial-device of how many sheets must be bunched together to be cut by the next operation of the machine for a given character, or for particular legend-matter on the index corresponding with the marking on the dial.

From the foregoing description the operation of the machine will be understood to be as follows, with reference to the letters of the alphabet used, as represented, for the index-characters and printed in proper order on sheets of the book at their edge-portions.

With a book clamped in position the operator, after letting down the back cover to permit it to hang, counts off or releases one at a time, from his hand holding all the sheets in the curved condition represented, the number of sheets, the last released of which bears on its edge-portion the letter "Z." This bunch, obviously, does not require to be cut, so is let-down with the back cover. The next number of sheets is then released, the last so released bearing the letter "Y," and this bunch crosses the bar 140 to rest at its free edge on the cutter-member 36 and shelf 148. This is done while the parts of the machine are in the relative positions represented and at rest, except for the continuous rotation of the pulley 44 and gear 46. The operator, seated in front of the machine, then places his foot on the treadle 62 to depress it and effect clutching of the gear to the drive-shaft and produce its continuous rotation while the treadle remains so depressed. In the first rotation of the shaft the cutter-member 35 descends to cut a section out of the sheets beneath it from the character "Y" to the end of the bunch of sheets, and thereupon the shelf turns backward under the action of the cam 50 to permit the cut sheets to drop and the knife rises, while the cam 49 raises the wheel 97 (see Fig. 13) into the path of the rack 70, or the stop-tooth 108 into the path of the teeth 105, as the case may be, and while the rack 86 (see Figs. 16 and 17) effects turning of the ratchet 80 to rotate the shaft 75, which causes the pinion 77 upon it, by its engagement with the rack 72, to advance the carriage 69 until it is stopped by the first tooth 71 of the rack 70 encountering a tooth 98 in its path on the wheel 97, or by a tooth 105 encountering a stop-tooth 108, whichever stop-device is in use. Without further feeding the carriage the shaft 75 continues to rotate until the finger 70 releases the pawl 81 from the ratchet 80, when the spring 95 retracts the wheel 97 (or tooth 108). The operator frees the next set of leaves up to the leaf bearing the letter "X," thus placing the bunch in position to be cut by the descent of the cutter-member, with a repetition of the operations already described. The feeding and cutting are repeated in the same manner until all the cuts have been made to complete the index. If a bunch of sheets, because of its thickness, requires to be cut repeatedly in the same place, the knife 35 is caused to rise and descend on each section of the bunch placed beneath it without actuating the feed, by the operator depressing the treadle 114 (see Figs. 1, 3, 13 and 14) to apply the brake 116 to the collar 112 and lock the shaft 75 to overcome its friction-drive, involving the washers 82, 83.

The carriage may be returned from any point of its advance entirely to or part way toward its initial position (with the treadle 62 released to unclutch the drive-shaft) by turning in the direction toward the left the hand-wheel to rotate the shaft 75 and cause the gear 77 to reverse its action on the rack 72, thereby overcoming the friction-drive of the feed-shaft.

While the two forms of the stop-device for the feed, herein shown and described, operate on the same general principle for the same general purpose, they do not present alternative constructions or modifications one of the other, but both are necessary to the completeness of the machine since they are not adapted for the same identical purpose. The wheel-arm is not susceptible of use for other than a uniform step-by-step feed, and presents the advantage of ready adjustment for varying the extent of the uniform steps; while the device involving the adjustable teeth 105 is particularly adapted for practical use where the machine is required to produce feed-steps varying in length.

What I claim as new and desire to secure by Letters Patent is—

1. In an index-cutting machine, the combination with a reciprocating member having a cutter, of a carriage for the work movable on the track, a feed-shaft, a track, geared to the carriage, a stop-rack on the carriage, and a rotatably mounted wheel provided with stop-teeth in rows and movable into and out of the path of said rack, the spaces between teeth in each row thereof forming equal divisions of the space between adjacent teeth of the stop-rack, for the purpose set forth.

2. In an index-cutting machine, the combination with a reciprocating member having a cutter, of a track, a carriage for the work movable on the track, a feed-shaft geared to the carriage, a stop-rack on the carriage having uniformly spaced teeth, a rotatably mounted wheel provided with stop-teeth in rows, and with a blank space, the spaces between the teeth in each row thereof forming equal divisions of the extent of space between adjacent teeth of the stop-rack, a second stop-rack on the carriage comprising a bar with teeth adjustable upon it to vary their distances apart, and a stop-tooth movable into and out of the path of said second rack, for the purpose set forth.

3. In an index-cutting machine, the combination with a frame, of a drive-shaft journaled thereon containing a crank-section and carrying a cam, a cutter on the frame having a vertically reciprocating member connected with said crank-section, a track, a carriage for the work movable on the track, a rack on said carriage, a feed-shaft having a friction-drive geared to said reciprocating member, a pinion on said shaft engaging the rack, a stop-rack on the carriage having its teeth uniformly spaced apart, a lever fulcrumed on the frame and engaging at one end with said cam, and a wheel rotatably mounted on the opposite end of the lever and provided with stop-teeth in rows to engage with the stop-rack, the spaces between the teeth in each row thereof forming equal divisions of the space between adjacent teeth of the stop-rack, for the purpose set forth.

4. In an index-cutting machine, the combination with a frame, of a drive-shaft journaled thereon containing a crank-section and carrying a cam, a cutter on the frame having a vertically reciprocating member connected with said crank, a track, a carriage for the work movable on the track, a rack on said carriage, a feed-shaft having a friction-drive geared to said reciprocating member, a pinion on said shaft and a lever for actuating said brake-device engaging the rack, a stop-rack on the carriage having its teeth uniformly spaced apart, a spring-retracted lever fulcrumed on the frame and engaging at its lower end with said cam, an extension on the upper end of the lever, a wheel rotatably mounted on said lever and provided with stop-teeth in rows to engage with the stop-rack and with a blank space, the spaces between the teeth in each row thereof forming equal divisions of the space between adjacent teeth of the stop-rack, a second stop-rack on the carriage consisting of a bar with depending teeth adjustable upon it to vary their distances apart, and a stop-tooth adjustably supported on said lever-extension to engage with said second stop-rack, for the purpose set forth.

5. In an index-cutting machine, the combination with a reciprocating member having a cutter, of a track, a carriage for the work movable on the track, a feed-shaft having a rack and pinion connection with the carriage, stop-mechanism coöperating with the carriage to produce step-by-step movement thereof, and a brake-device on the feed-shaft and a lever for actuating said brake-device, for the purpose set forth.

6. In an index-cutting machine, the combination with a reciprocating member having a cutter, of a track, a carriage for the work movable on the track, a feed-shaft having a rack and pinion connection with the carriage, stop-mechanism coöperating with the carriage to produce step-by-step movement thereof, a pulley on the feed-shaft, a brake-band on the pulley having arms, a spring confined between said arms, a treadle and a treadle-actuated rod engaging one of said arms, for the purpose set forth.

7. In an index-cutting machine, the combination with a reciprocating member having a cutter, of a track, a carriage for the work movable on the track, a feed-shaft having a rack and pinion connection with the carriage, stop-mechanism coöperating with the carriage to produce step-by-step movement thereof, a pulley on the feed-shaft, a spring brake-band about the pulley having arms, a treadle, and a treadle-actuated rod passing through one of said arms and engaging the other and having a spring confined about it between the arms, for the purpose set forth.

8. In an index-cutting machine, the combination with a frame, of a drive-shaft journaled thereon containing a crank, a vertically reciprocating head carrying a cutter-member, a rod connecting said cutter-member and crank, a track, a carriage for the work movable on the track, a feed-shaft having a rack and pinion connection with the carriage, a friction-drive on the feed-shaft having a rack and pinion connection with said head, stop-mechanism coöperating with the carriage to produce step-by-step movement thereof, a dial-carrying spindle journaled on said head and having a ratchet, and a pawl connected with said rod and engaging said ratchet, for the purpose set forth.

9. In an index-cutting machine, the combination with a frame, of a drive-shaft journaled thereon containing a crank, a vertically reciprocating head carrying a cutter-member, a rod connecting said cutter-member and crank, a track, a carriage for the work movable on the track, a feed-shaft having a rack and pinion connection with the carriage, a friction-drive on the feed-shaft having a rack and pinion connection with said head, stop-mechanism coöperating with the carriage to produce a step-by-step movement thereof, a dial-device having a dial rotatably and removably supported on said head, a casing covering the dial and provided with an opening through which the dial is exposed, a ratchet connected with said dial, and a pawl on said rod engaging the ratchet, for the purpose set forth.

10. In an index-cutting machine, the combination with a frame, of a drive-shaft journaled thereon containing a crank, a vertically reciprocating head carrying a cutter-member, a rod connecting said cutter-member and crank, a track, a carriage for the work movable on the track, a feed-shaft having a rack and pinion connection with the carriage, a friction-drive on the feed-shaft having a rack and pinion connection with said head, stop-mechanism coöperating with the carriage to produce step-by-step movement thereof, a dial-device consisting of a spindle journaled on said head and carrying a ratchet, a dial releasably clamped between washers on said spindle with a stud on one washer projecting through the other washer and the interposed dial, a casing removably supported on said head to cover the dial and containing an opening, and a spring-controlled pawl extending from said rod into engagement with the ratchet, for the purpose set forth.

FREDERICK P. ROSBACK.

In presence of—
J. H. LANDES,
R. A. SCHAFER.